(12) United States Patent
Watanabe

(10) Patent No.: US 7,787,911 B2
(45) Date of Patent: Aug. 31, 2010

(54) ELECTRONIC APPARATUS, COMMUNICATION SYSTEM, AND PROGRAM

(75) Inventor: Yasuhiko Watanabe, Fussa (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 924 days.

(21) Appl. No.: 11/603,610

(22) Filed: Nov. 21, 2006

(65) Prior Publication Data

US 2007/0117574 A1    May 24, 2007

(30) Foreign Application Priority Data

Nov. 22, 2005   (JP) .............................. 2005-336599

(51) Int. Cl.
*H04B 1/38* (2006.01)
(52) U.S. Cl. ................. 455/572; 455/456.1; 455/552.1; 455/566; 455/404.2; 455/457
(58) Field of Classification Search ... 455/404.1–404.2, 455/456.1–457, 572, 573, 574, 566, 343.4, 455/343.5, 343.6, 550.1, 552.1
See application file for complete search history.

(56) References Cited

U.S. PATENT DOCUMENTS

| | | | |
|---|---|---|---|
| 6,721,553 B2 * | 4/2004 | Yoshioka | 455/404.1 |
| 6,975,941 B1 * | 12/2005 | Lau et al. | 701/213 |
| 2003/0144042 A1 * | 7/2003 | Weinfield et al. | 455/574 |
| 2005/0215230 A1 * | 9/2005 | Cheng | 455/404.2 |
| 2006/0205445 A1 * | 9/2006 | Sakaniwa et al. | 455/574 |
| 2007/0004404 A1 * | 1/2007 | Buckley et al. | 455/434 |

FOREIGN PATENT DOCUMENTS

| | | |
|---|---|---|
| JP | 2002-209248 | 7/2002 |
| JP | 2003-078905 | 3/2003 |
| JP | 2003-217058 | 7/2003 |
| JP | 2004-072499 | 3/2004 |
| JP | 2004-355539 | 12/2004 |
| JP | 2006-262255 | 9/2006 |

\* cited by examiner

*Primary Examiner*—Kamran Afshar
(74) *Attorney, Agent, or Firm*—Cohen Pontani Lieberman & Pavane LLP

(57) ABSTRACT

When an emergency mode is set, a CPU outputs an alert from an alerting unit and notifies the current position obtained by a GPS processing unit to a predetermined destination by a communication unit. When the main power is switched off, the CPU determines whether or not the emergency mode is set, and when determined that the emergency mode is set, stops power supply to display sections, etc. to pretend that the apparatus is completely switched off, but continues power supply to the GPS processing unit and communication unit to keep notifying the current position.

13 Claims, 9 Drawing Sheets

POSITION NOTIFYING SYSTEM 200

PORTABLE TELEPHONE APPARATUS

FIG.4

| EMERGENCY MODE FLAG | |
|---|---|
| POSITION NOTIFYING E-MAIL DESTINATION ADDRESS | karen@casiohitachi.com |
| POSITION NOTIFYING E-MAIL SENDER ADDRESS | corporation@casiohitachi.com |
| TITLE OF SUBJECT | EMERGENCY OCCURRED: CURRENT POSITION NOTIFICATION |
| NAME | Karen C. Dow |
| MESSAGE | CURRENT POSITION OF [NAME INSERTED] (PORTABLE TELEPHONE NUMBER 1234-5678-9012) IS [POSITION INFORMATION INSERTED]. |

| t1 | t2 |
|---|---|

| Tm1 | Tm2 |
|---|---|

FIG.7

| To | karen@casiohitachi.com |
|---|---|
| From | corporation@casiohitachi.com |
| SUBJECT | EMERGENCY OCCURRED: CURRENT POSITION NOTIFICATION |

CURRENT POSITION OF
KAREN C. DOW
(PORTABLE TELEPHONE NUMBER 1234-5678-9012)
IS
LATITUDE 34 44' 55" NORTH
AND
LONGITUDE 134 34' 22" EAST.

ELECTRONIC APPARATUS, COMMUNICATION SYSTEM, AND PROGRAM

BACKGROUND OF THE INVENTION

1. Field of the Invention

The present invention relates to an electronic apparatus having a position notifying function for notifying its own position, a communication system using the electronic apparatus, and a program.

2. Description of the Related Art

A portable communication terminal apparatus (portable telephone apparatus) having a crime prevention buzzer function is proposed. A conventional portable communication terminal apparatus having a crime prevention buzzer function sets off an alerting sound when an emergency button is pressed. Further, a portable telephone apparatus having a position measuring function is also proposed. As such a portable telephone apparatus having a position measuring function, an apparatus which sends information indicating its current position together with a shot image of the surrounding environment is disclosed in Unexamined Japanese Patent Application KOKAI Publication No. 2003-078905. And an apparatus which sends its current position, personal information (name, address, etc.), a shot image, and an emergency message by means of an e-mail to a predetermined e-mail address is disclosed in Unexamined Japanese Patent Application KOKAI Publication No. 2004-355539.

However, the portable telephone apparatuses disclosed in Unexamined Japanese Patent Application KOKAI Publication No. 2003-078905 and Unexamined Japanese Patent Application KOKAI Publication No. 2004-355539 can send information only while the power is on. Accordingly, when the power is switched off, the apparatus can neither set off an alerting sound nor send positional information, etc.

SUMMARY OF THE INVENTION

The present invention was made in view of the above-described circumstance, and an object of the present invention is to provide an electronic apparatus which can send positional information even after the main power is switched off, and a system using the electronic apparatus.

To achieve the above object, an electronic apparatus according to the present invention comprises:

a position determining unit which determines a position of the electronic apparatus;

a notifying unit which notifies position information which specifies the position determined by the position determining unit to a predetermined destination; and a condition-satisfied determining unit which determines whether or not a predetermined condition is satisfied, when an instruction for switching off a main power of the electronic apparatus is given, wherein in a case where the condition-satisfied determining unit determines that the predetermined condition is satisfied, even after the main power is switched off, the position determining unit determines the position of the electronic apparatus and the notifying unit notifies the position information to the predetermined destination.

BRIEF DESCRIPTION OF THE DRAWINGS

These objects and other objects and advantages of the present invention will become more apparent upon reading of the following detailed description and the accompanying drawings in which:

FIG. 4 is a diagram showing an example of setting data stored in a storage unit of FIG. 2;

FIG. 7 is a diagram showing an example of an emergency e-mail;

DETAILED DESCRIPTION OF THE PREFERRED EMBODIMENT

A position notifying system and a portable telephone apparatus used in the position notifying system according to an embodiment of the present invention will be explained below.

Figure 1:
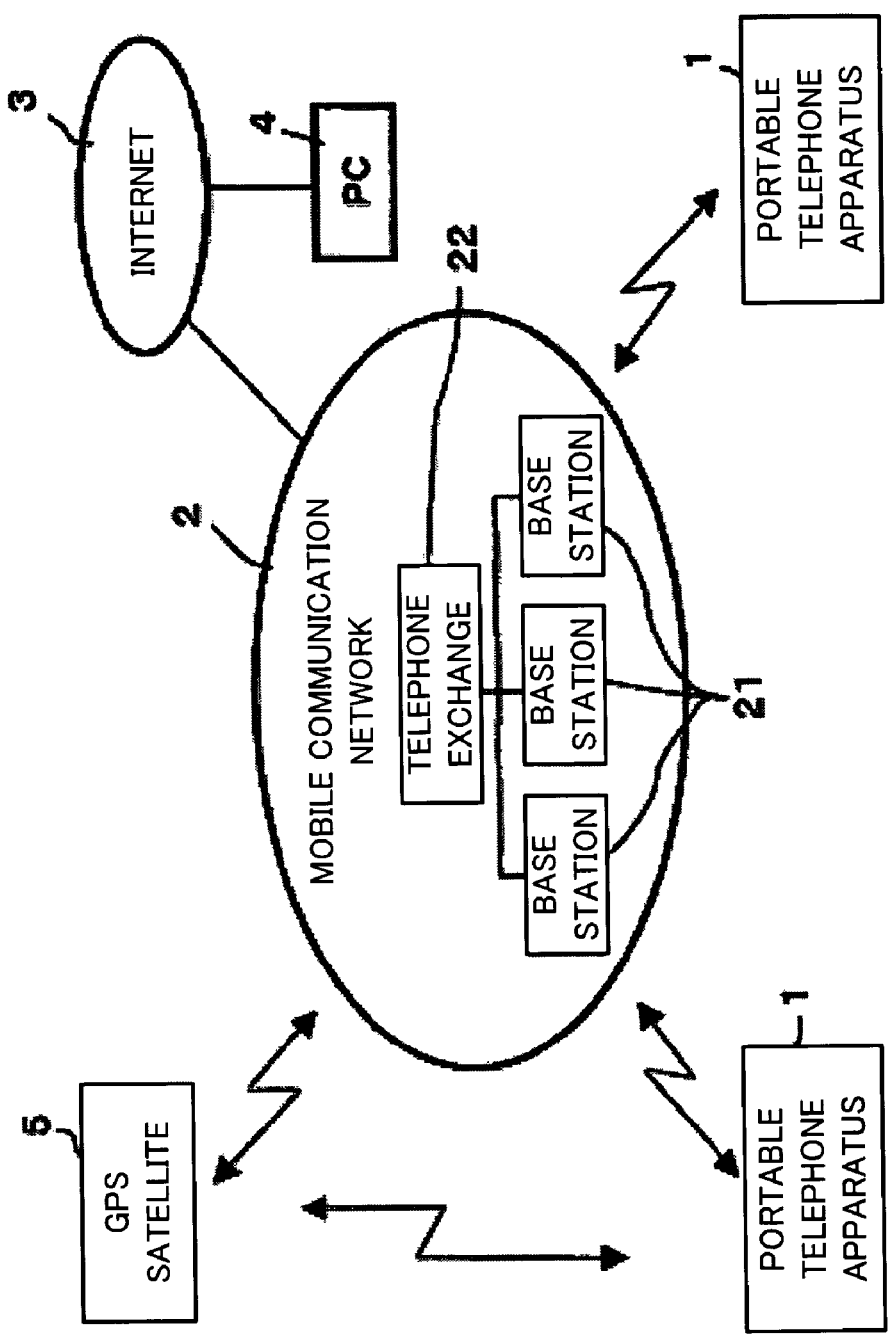
FIG. 1 is a block diagram showing the entire configuration of a position notifying system utilizing a portable communication terminal apparatus (portable telephone apparatus)

The position notifying system 200 comprises a portable telephone apparatus 1, a mobile communication network 2, Internet 3, a personal computer (PC) 4, a GPS satellite 5, etc. as shown in FIG. 1.

The portable telephone apparatus 1 has a function as a so-called crime prevention buzzer. The portable telephone apparatus 1 has a function for determining its current position and notifying the position by e-mails repetitively to a predetermined destination (for example, family member, security firm, etc.) while the crime prevention buzzer is sounding. Further, through a base station 21 constituting the mobile communication network 2, the portable telephone apparatus 1 registers information which associates the identification information of the apparatus 1 itself with a base station 21 which administers the area in which the apparatus 1 is positioned, in a database installed at a telephone exchange 22.

Figure 2:
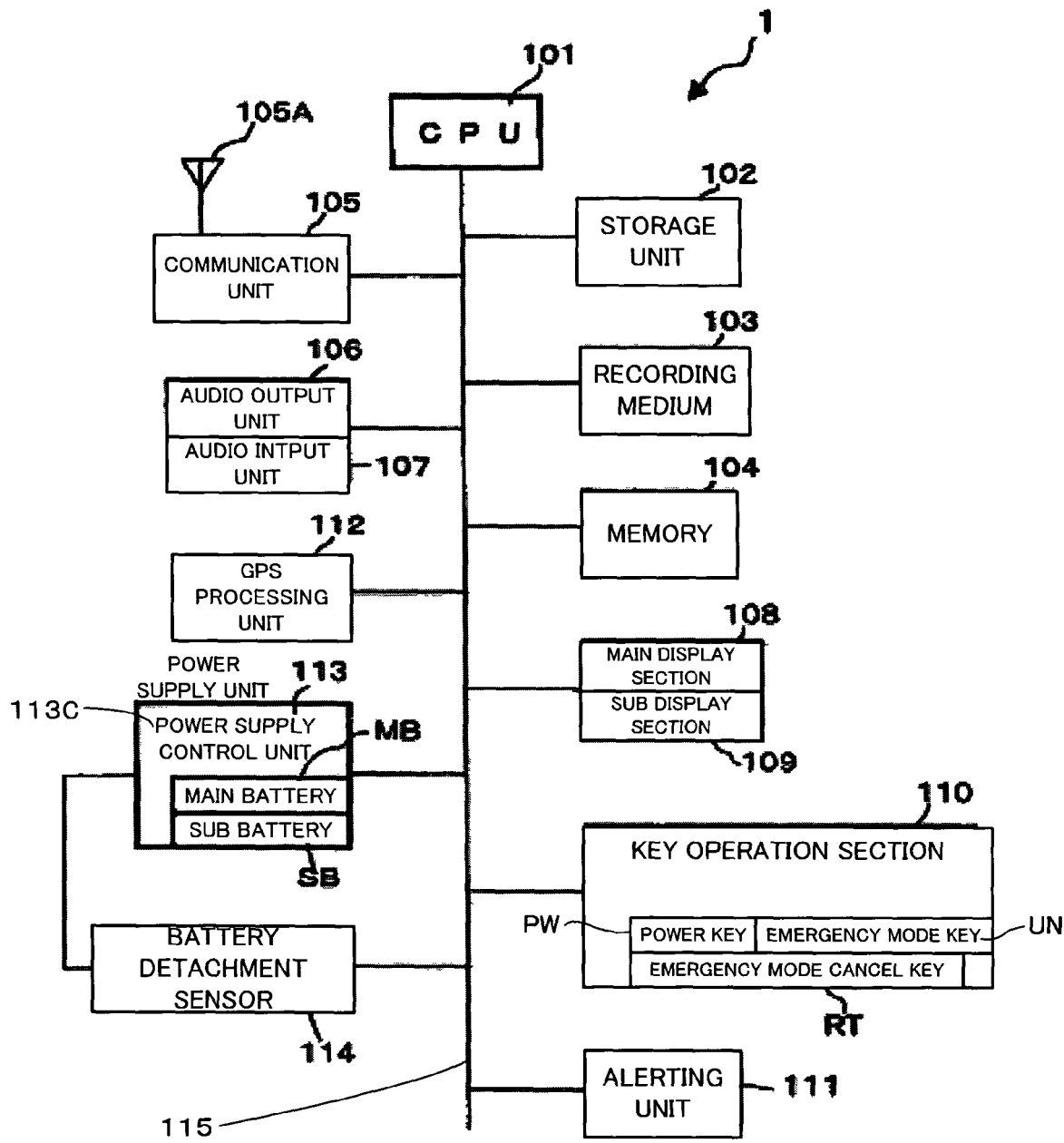
FIG. 2 is a block diagram of the portable telephone apparatus.

The portable telephone apparatus 1 having the above-described function comprises, a CPU 101, a storage unit 102, a recording medium 103, a memory 104, a communication unit 105, an audio output unit 106, an audio input unit 107, a main display section 108, a sub display section 109, a key operation section 110, an alerting unit 111, a GPS processing unit 112, a power supply unit 113, a battery detachment sensor 114, and a bus 115, as shown in FIG. 2.

The CPU 101 is a central processing device for controlling the operation of the portable telephone apparatus 1 in accordance with an operation program and parameters stored in the storage unit 102. The detail of the operation will be described later with reference to FIG. 6, FIG. 8, FIG. 9, etc.

The storage unit 102 comprises a non-volatile memory (internal memory) such as a flash memory, etc. The storage unit 102 has a program area and a data area. A program for realizing the operation procedures shown in FIG. 6, FIG. 8, FIG. 9, etc. to be described later is stored in the program area.

Information necessary for notifying the current position of the portable telephone apparatus 1 to a pre-designated destination in case of emergency is stored in the data area of the storage unit 102. This information includes the e-mail address (or e-mail addresses) of the notification destination, subject (title), message, etc. as shown in FIG. 4. In addition, an "emergency mode flag" which is set when an emergency mode key UN is depressed and reset when an emergency mode cancel key RT is depressed, time intervals (cycles) t1 and t2 at which position registration for registering information indicating the position of the portable telephone apparatus 1 (indicating the position of the apparatus 1 in terms of the administration area of which base station 21) to the telephone exchange 22 in the mobile communication network 2 is performed, time intervals (emergency e-mail sending cycles) Tm1 and Tm2 at which an emergency e-mail for notifying the occurrence of an emergency and the current position is sent, etc. are also set.

These kinds of information can be edited by, for example, using existing editing techniques while the user operates the key operation section 110.

The storage unit 102 also stores other arbitrary data such as, for example, an address book (unillustrated) for storing e-mail addresses.

The recording medium 103 is a detachable carryable memory, and comprises, for example, a smart media, an IC card, or the like. The recording medium 103 stores image data of an image photographed by the portable telephone apparatus 1, various data, an operation program for the CPU 101, etc.

The memory 104 is an internal memory functioning as a work memory of the CPU 101. The memory 104 comprises, for example, a DRAM (Direct Random Access Memory), an SDRAM (Synchronous Dynamic Random Access Memory), or the like.

Figure 5:
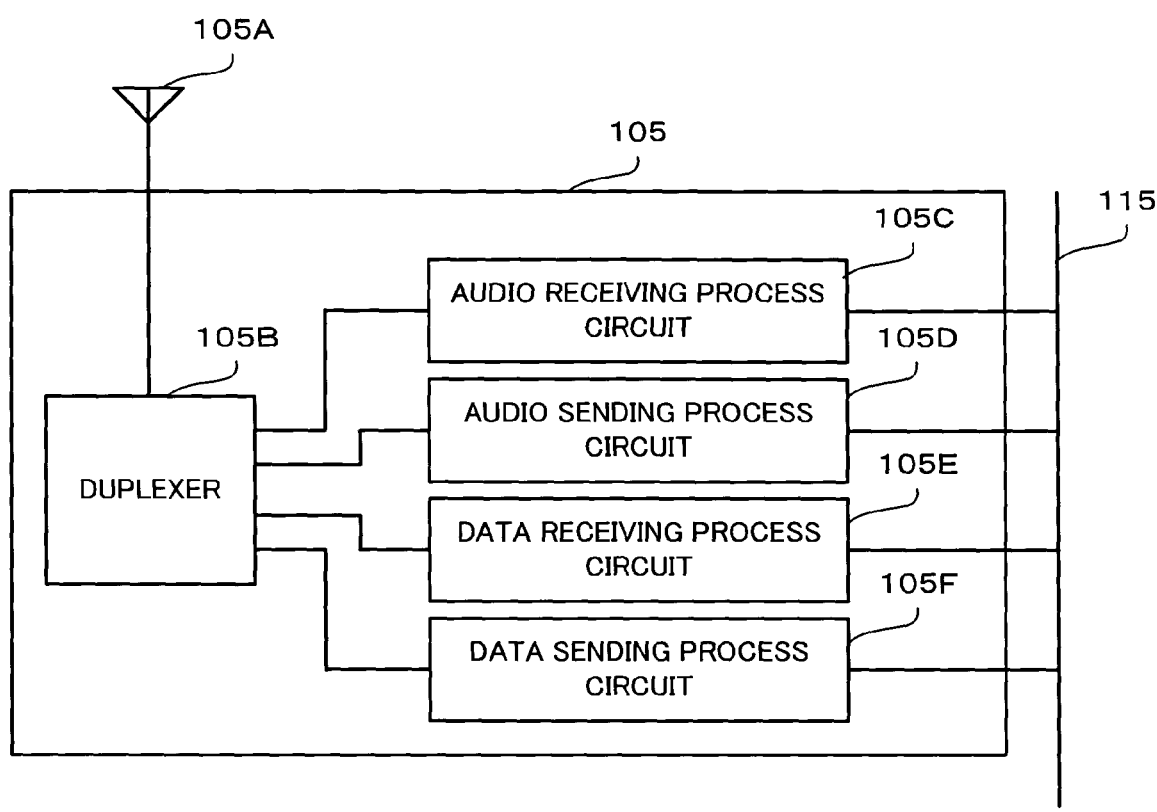
FIG. 5 is a block diagram showing the configuration of a communication unit of FIG. 2.

The communication unit 105 comprises an antenna 105A, a duplexer 105B, an audio receiving process circuit 105C, an audio sending process circuit 105D, a data receiving process circuit 105E, and a data sending process circuit 105F as shown in FIG. 5, and has a function for performing audio communication and internet connection. The audio receiving process circuit 105C, the audio sending process circuit 105D, the data receiving process circuit 105E, and the data sending process circuit 105F can be supplied with power independently, and activated or inactivated independently.

The audio receiving process circuit 105C acquires a received audio signal from the duplexer 105B connected to the antenna 105A, demodulates the digital audio signal, and supplies it to the audio output unit 106.

The audio sending process circuit 105D generates a base band signal from a digital audio signal, modulates a carrier signal with this base band signal, and sends the audio signal from the antenna 105A through the duplexer 105B.

The data receiving process circuit 105E acquires digital data such as an e-mail, a web page, etc. from the duplexer 105B connected to the antenna 105A, demodulates the signal to restore the original data, and supplies the data to the CPU 101, the main display section 108, etc.

The data sending process circuit 105F generates a base band signal from digital data to be sent such as an e-mail, etc., modulates a carrier signal with this base band signal, and sends the digital data from the antenna 105A through the duplexer 105B.

The audio output unit 106 comprises a D/A (Digital-Analog) converter, an amplifier, a speaker, etc. The audio output unit 106 converts audio data supplied from the communication unit 105 into an analog signal by the D/A converter, amplifies the analog signal by the amplifier, and sounds it out from the speaker.

The audio input unit 107 comprises a microphone, an amplifier, an A/D (Analog-Digital) converter, etc. The audio input unit 107 converts an audio signal into an electric signal by the microphone, amplifies the electric signal by the amplifier, converts the amplified signal into a digital signal by the A/D converter, and supplies the digital signal to the communication unit 105.

The main display section 108 comprises a liquid crystal display device, a display controller, etc., and displays display data such as character information, various messages supplied from the communication unit 105.

The sub display section 109 is provided at the back of the apparatus body, and displays the current date and time, brief messages, icons, etc.

The key operation section 110 comprises various keys or buttons such as a power key PW, an emergency mode key UN, an emergency mode cancel key RT, etc., by which dial input, input of characters, input of commands, etc. are given. The CPU 101 performs a process corresponding to a key input signal form the key operation section 110.

The power key PW is a button for switching on or off the main power. When the main power is on is a state in which the principal functions of the portable telephone apparatus 1 can be used. When the main power is off is a state in which the principal functions of the portable telephone apparatus 1 cannot be used. When a standby power is supplied to a part of the internal circuit of the portable telephone apparatus 1, and when a part of the functions of the portable telephone apparatus 1 is effective are also included in the state that the main power is off.

The emergency mode key UN is provided at a position of easy use by the user, and operated by the user when a certain emergency occurs. When the emergency mode key UN is pressed, the portable telephone apparatus 1 is set to an emergency mode. In this emergency mode, the alerting unit 111 outputs a loud alerting sound and blinks a lamp such as an LED, etc., whereby the portable telephone apparatus 1 functions as a crime prevention buzzer. Further, in the emergency mode, the portable telephone apparatus 1 notifies its current position to a predetermined destination by an e-mail (emergency e-mail). The CPU 101 sets the "emergency mode flag" in the storage unit 102 in response to an operation on the emergency mode key UN.

The emergency mode cancel key RT is a button for instructing that the emergency mode should be canceled. The CPU 101 stops the alerting unit 111 from generating the alerting sound and resets the "emergency mode flag" set in the storage unit 102 in response to an operation on the emergency mode cancel key RT.

The alerting unit 111 comprises a speaker, an LED (Light Emitting Diode), and a vibration motor. The alerting unit 111 notifies the reception of an e-mail when it receives the e-mail, by generating a sound from the speaker, lighting the LED, vibrating the vibration motor, etc.

The GPS processing unit 112 receives GPS signals from a plurality of GPS satellites 5. The GPS processing unit 112 finds the current position (longitude and latitude) of the portable telephone apparatus 1 from the received GPS signals, and supplies the current position to the CPU 101. Known arbitrary methods can be used as the method by which the GPS processing-unit 112 finds the current position. For example, the GPS processing unit 112 can find the current position by i) calculating the position by itself from the difference in time taken for radio waves from a plurality of GPS satellites 5 to arrive, ii) taking into consideration not only the signals from the GPS satellites 5 but also the positional information of a nearby base station 21, and iii) sending information regarding a received radio wave to an external position detecting server through the communication unit 105 and receiving information showing a calculated position from the server. In the above-described emergency mode, the CPU 101 notifies the current position obtained by the GPS processing unit 112 to a predetermined destination by an e-mail.

The power supply unit 113 comprises a main battery MB detachably attached, a sub battery SB, and a power supply control unit 113C. The CPU 101 issues a signal for instructing the power supply unit 113 to be on or off, in response to an instruction whether the main power should be on or off, which is given by an operation on the power key PW on the key operation section 110.

When the main power is on, in accordance with an instruction from the CPU 101, the power supply control unit 113C supplies power to substantially all of the elements constituting the portable telephone apparatus 1. When the main power is off, in accordance with an instruction from the CPU 101, the power supply control unit 113C stops supplying power to those elements that are other than the elements realizing the position notifying function, among the elements of the portable telephone apparatus 1, if the operation mode is set to the emergency mode, while stops supplying power to substantially all of the elements including the elements realizing the position notifying function, if the operation mode is not set to the emergency mode. Note that while the main power is off, the power supply control unit 113C continues supplying power to the CPU 101 and the element for switching on the main power.

That is, when the main power is switched off while the portable telephone apparatus 1 is set to the emergency mode, the power supply control unit 113C stops power supply to the main display section 108, the sub display section 109, the audio receiving process circuit 105C, the audio sending process circuit 105D, etc. based on an instruction from the CPU 101. However, even after the main power is switched off, the power supply control unit 113C keeps supplying power to the data receiving process circuit 105E and data sending process circuit 105F of the communication circuit 105 and to the GPS processing unit 112, in order to keep the above-described GPS receiving function, position registering function, position notifying function, etc. active. Further, in a case where the main battery MB is detached in the emergency mode, the power supply control unit 113C supplies power to the CPU 101 and communication unit 105 by using the power stored in the sub battery SB, in order to make the position registering function workable. The detail of the control operation of the power supply control unit 113C will be described later.

The battery detachment sensor 114 comprises a micro switch, a light sensor, etc., and supplies a detection signal to the CPU 101 when it detects that the main battery MB is detached from the body of the portable terminal apparatus 1.

The bus 115 transmits information and signals between the respective elements.

Figures 3A, 3B:
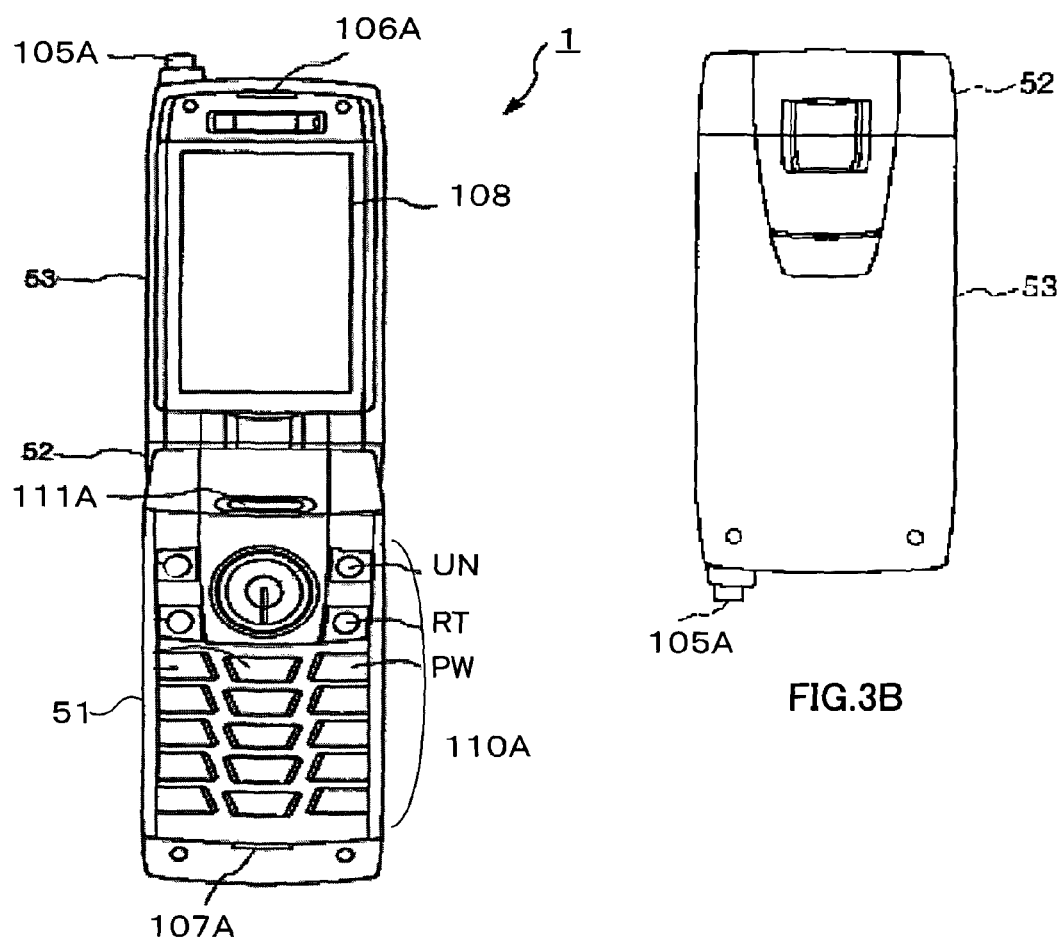
FIG. 3A is a diagram showing the appearance of the portable telephone apparatus in an open state.
FIG. 3B is a diagram showing the appearance of the portable telephone apparatus in a closed state.

The portable telephone apparatus 1 having the above-described internal configuration comprises a body portion 51, a hinge portion 52, and a lid portion 53, as shown in FIG. 3A and FIG. 3B. The body portion 51 and the lid portion 53 are jointed by the hinge portion 52. The hinge portion 52 enables the lid portion 53 to rotate with respect to the body portion 51 to make the lid portion 53 and the body portion 51 opened or closed with respect to each other.

The speaker 106A of the audio output unit 106, and the main display section 108 are provided at the front surface of the lid portion 53.

A notifying speaker 111A, various keys 110A constituting the key operation section 110, the microphone 107A constituting the audio input unit 107, etc. are provided on the body portion 51.

The keys 110A include the power key PW, the emergency mode key UN, and the emergency mode cancel key RT.

The mobile communication network 2 shown in FIG. 1 is an ordinary mobile communication network.

A plurality of base stations 21, and the telephone exchange 22 are provided on the mobile communication network 2. Each base station 21 wirelessly communicates with the portable telephone apparatus 1. The telephone exchange 22 performs switching operations in order to establish communication paths. For the switching operations, the telephone exchange 22 comprises a database which stores data indicating the portable telephone apparatus 1 and the administration area (communication area) of which base station 21 the portable telephone apparatus 1 is positioned in.

Since the portable telephone apparatus 1 moves, the information in this database needs to be updated periodically. In order that the database shall be updated, the base station 21 requests the portable telephone apparatus 1 to notify the identification information (telephone number). Each portable telephone apparatus 1 notifies its identification information to one of communicable base stations 21, that is best communicable. Each base station 21 notifies the identification information notified thereto, to the telephone exchange 22. The telephone exchange 22 registers the identification information of the portable telephone apparatus 1 in the database in association with the base station 21 which has notified the identification information. In other words, the portable telephone apparatus 1 periodically notifies its position (the communication area of which base station 21) to the telephone exchange 22. When there is a call request to certain identification information, the telephone exchange 22 determines which base station 21 administers the portable telephone apparatus 1 which has that identification information from the contents of the database, and calls that portable telephone apparatus 1 through the determined base station 21.

Figure 8:
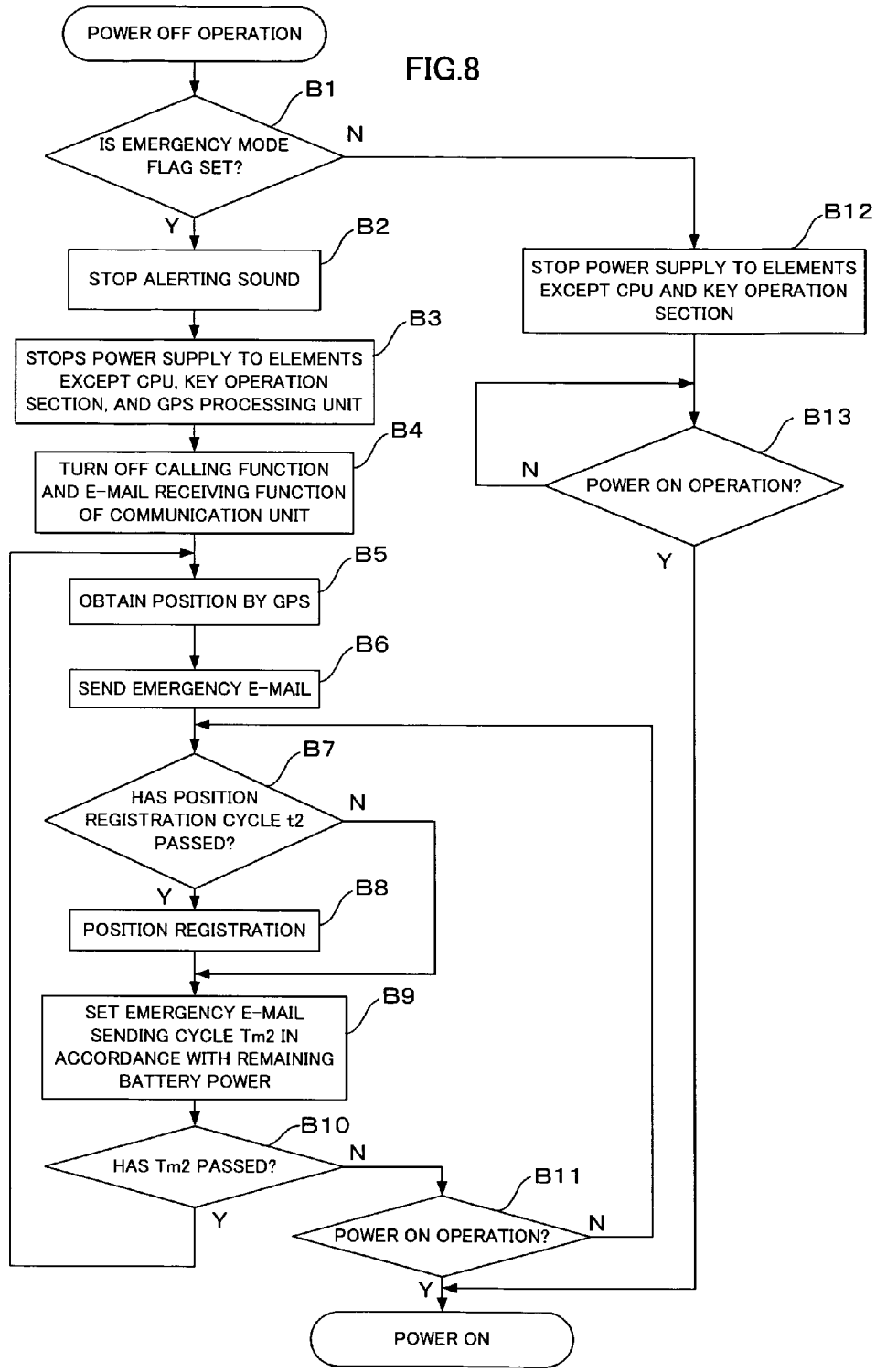
FIG. 8 is a flowchart showing an operation of the portable telephone apparatus to be performed in response to a power off operation.

Next, the operations of the portable telephone apparatus 1 having the above-described configuration will be explained with reference to the flowcharts shown in FIG. 6, FIG. 8, and FIG. 9.

The basic operation of the portable telephone apparatus 1 is the same as that of an ordinary portable telephone. However, the portable telephone apparatus 1 performs unique operations of I) generating an alerting sound like a crime prevention buzzer, and II) even if the main power is switched off while the emergency mode is set, i) registering the base station 21 with which the portable telephone apparatus 1 communicates to the telephone exchange 22, and ii) notifying its current position detected by the GPS processing unit 112 to a predetermined address by an e-mail. Therefore, these characteristic operations will be mainly explained below.

When the power key PW is depressed for a predetermined time or longer while the power of the portable telephone apparatus 1 is off, the key operation section 110 detects this key operation and sends a power on signal for instructing the power to be switched on to the CPU 101 through the bus 115. In response to the power on signal, the CPU 101 starts the process shown in the flowchart of FIG. 6.

Figure 6:
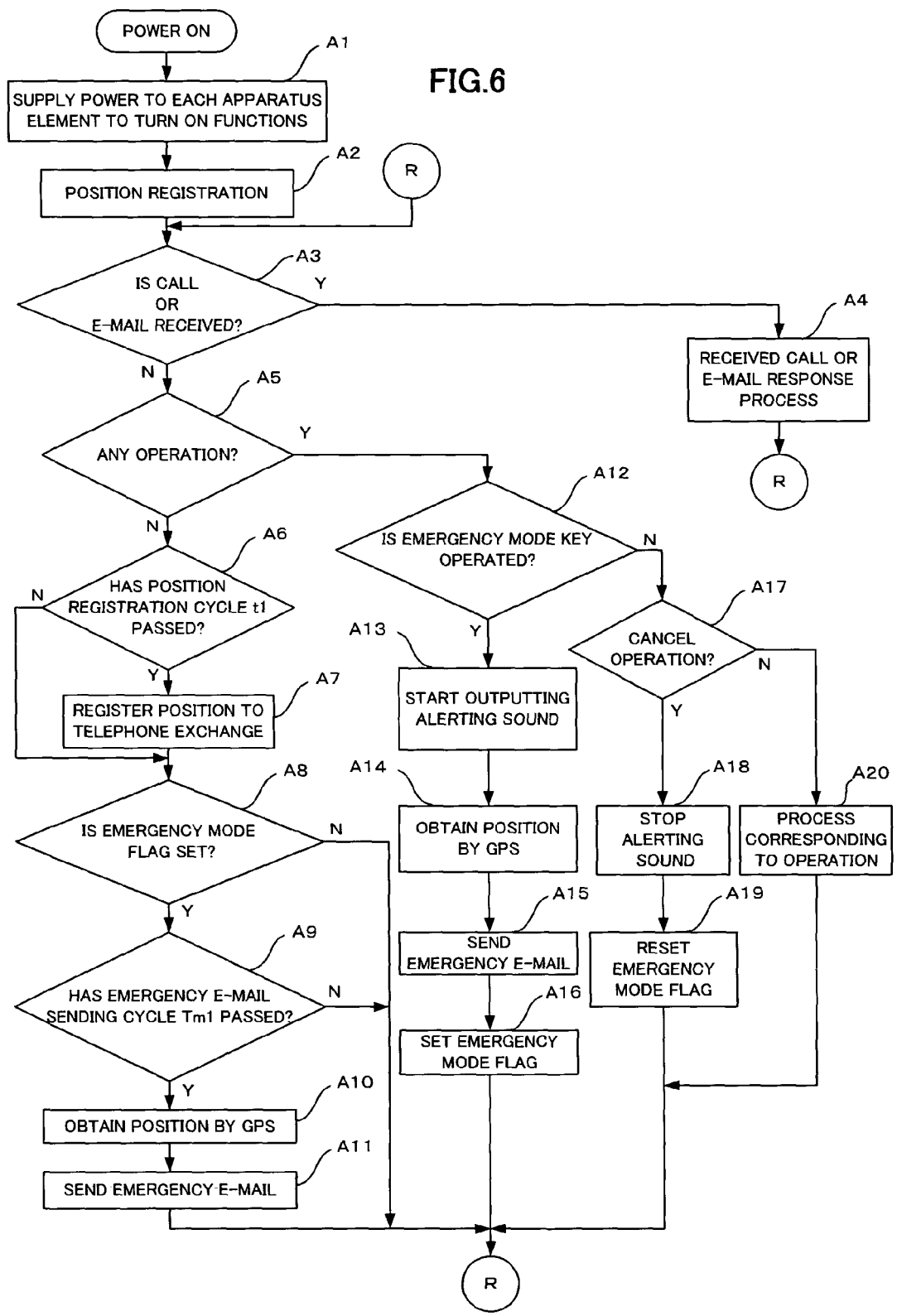
FIG. 6 is a flowchart showing an operation of the portable telephone apparatus to be performed in response to a power on operation.

On starting the process of FIG. 6, the CPU 101 first sends a power on signal to the power supply unit 113. In response to the power on signal, the power supply control unit 113C starts supplying power to each element constituting the portable telephone apparatus 1, for example, the communication unit 105, the main display section 108, and the sub display section 109 (step A1). Thus, the communication function and display function of the portable telephone apparatus 1 are turned on. Then, the CPU 101 operates the communication unit 105 to communicate with the base stations 21 in its neighborhood and detect a base station 21 from which the strongest radio wave is received. Then, the CPU 101 registers its position (the communication area of which base station 21 it is in, or which base station 21 it is communicating with) to the database of the telephone exchange 22 through the detected base station 21 (step A2). In other words, the portable telephone apparatus 1 notifies its position to the telephone exchange 22 through the base station 21, so that the notified position may be registered in the database. Then, the CPU 101 activates a position registration cycle timer (software timer).

The CPU 101 checks whether or not the portable telephone apparatus 1 receives a call or an e-mail (step A3). When it is determined that the portable telephone apparatus 1 receives a call or an e-mail (step A3; Yes), the CPU 101 controls the alerting unit 111 to perform a process for responding to the received call or e-mail (ring alert generation/vibrant alerting) (step A4). After this, the flow returns to step A3.

To the contrary, when it is determined at step A3 that there is no call or e-mail received (step A3; No), the CPU 101 checks whether or not any key or button of the key operation section 110 is operated, from any key operation signal from the key operation section 110 (step A5).

In a case where it is determined at step A5 that any key or button is operated (step A5; Yes), the CPU 101 determines whether or not the operated key or button is the emergency mode key UN (step A12). The emergency mode key UN is a key for making the portable telephone terminal 1 function as a crime prevention buzzer. For the emergency mode key UN to have been pressed indicates that the user is in a certain danger. Thus, in a case where it is determined that the emergency mode key UN is operated (step A12; Yes), the CPU 101 controls the alerting unit 111 to generate a loud alerting sound (step A13). This alerting sound helps get a rubber, a stalker, a kidnapper, or the like to run away.

Then, the CPU 101 obtains current position information indicating the current position of the portable telephone apparatus 1 by the GPS processing unit 112 (step A14), reads out an e-mail address of a destination which is pre-registered in the storage unit 102 as a contact address in case of emergency, and generates an emergency e-mail as shown in FIG. 7, which includes the current position information. In the example of FIG. 7, the destination address of the emergency e-mail is "karen@casiohitachi.com" which is pre-registered in the storage unit 102, the sender address is "corporation@casiohitachi.com" which is pre-registered in the storage unit 102, and the subject is "emergency occurred: current position notification" which is pre-registered in the storage unit 102. The message includes a sentence "the current position of [name] (telephone number: 1234-5678-9012) is [position information]" pre-registered in the storage unit 102, into which the name, and the position information (longitude and latitude) obtained by the GPS processing unit 112 are inserted.

The CPU 101 sends the generated emergency e-mail to the PC 4 or another portable telephone apparatus 1 at the destination through the mobile communication network 2 and the Internet 3 (step A15). Then, the CPU 101 sets the "emergency mode flag" indicating that the portable telephone apparatus 1 is set to the "emergency mode" in the storage unit 102 (step A16).

In a case where it is determined at step A12 that the emergency mode key UN is not operated (step A12; No), the CPU 101 determines whether or not the emergency mode cancel key RT is operated (step A17). In a case where it is determined that the emergency mode cancel key RT is operated (step A17; Yes), the CPU 101 controls the alerting unit 111 to stop the alerting operation (step A18). Accordingly, the alerting unit 111 has kept outputting the alerting sound from when it started outputting the alerting sound at step A13 until when it stops outputting at step A18.

Then, the CPU 101 resets the "emergency mode flag" stored in the storage unit 112 (step A19). Since the alerting sound is kept being output until the emergency mode is canceled, the user can expect help from around. In a case where another key or button than the emergency mode key UN and emergency mode cancel key RT is operated (steps A12 and A17; No), the CPU 101 performs a process of receiving input of a telephone number, generating an e-mail, or the like as the process corresponding to the operated key or button (step A20).

After the processes of step A16, step A19, and step A20, the flow returns to step A2.

Meanwhile, in a case where it is determined at step A5 that no key or button is operated (step A5; No), the CPU 101 determines whether or not a predetermined time (position registration cycle t1) has passed after the previous position registration (step A6). When it is detected that the position registration cycle t1 has passed after the previous position registration (step A6; Yes), the CPU 101 performs position registration, i.e., registers the identification information of the portable telephone apparatus 1 in the database of the telephone exchange 22 through a base station 21 (step A7).

In a case where it is determined at step A6 that the position registration cycle t1 has not passed (step A6; No), the CPU 101 skips step A7 and checks whether or not the "emergency mode flag" is set in the storage unit 102 (step A8). In a case where it is determined that the "emergency mode flag" is not set (step A8; No), the CPU 101 returns its control to the above-described step A3.

To the contrary, in a case where it is determined at step A8 that the "emergency mode flag" is set (step A8; Yes), i.e., in a case where the portable telephone apparatus 1 is in the emergency mode and there is no key operation, the CPU 101 determines whether or not the position registration cycle t1 has passed, and determines whether or not a predetermined time (emergency e-mail sending cycle Tm1) or longer has passed after the previous emergency e-mail was sent, by checking an emergency e-mail sending cycle timer (software timer) (step A9). In a case where it is detected that the emergency e-mail sending cycle Tm1 or longer has passed after the previous emergency e-mail was sent (step A9; Yes), the CPU 101 obtains current position information by the GPS processing section 112 (step A10). The CPU 101 generates an emergency e-mail including the obtained current position information, and sends it to the PC4 or another portable telephone apparatus 1 at the destination through the communication unit 105, the mobile communication network 2, and the Internet 3 (step A11). Thereafter, the flow returns to step A3.

In this manner, in the emergency mode, the current position is registered to the telephone exchange 22 once in each cycle t1, and an e-mail for notifying the current position is sent to the e-mail address pre-registered in the storage unit 102 once in each emergency e-mail sending cycle Tm1.

When the power key PW is kept pressed for a predetermined time or longer while the main power of the portable telephone apparatus 1 is on, the key operation section 110 detects that an instruction for switching off the main power is given, and outputs a power off signal to the CPU 101. In response to this power off signal, the CPU 101 starts a power off process shown in FIG. 8.

In this power off process, the CPU 101 determines whether or not the "emergency mode flag" is set in the storage unit 112 (step B1). In other words, the CPU 101 checks whether or not the power off operation is made in the emergency mode. In a case where it is determined that the "emergency mode flag" is not set, i.e., the power off operation is made in the state that the emergency mode is canceled (step B1; No), the CPU 101 supplies a power off signal to the power supply unit 113 (step B12). In response to this power off signal, the power supply control unit 113C of the power supply unit 113 stops supplying power to some elements such as, for example, the communication unit 105, the main display section 108, the sub display section 109, the GPS processing unit 112, etc. which are other than the CPU 101 and predetermined parts of the key operation section 110, etc. in order to turn off the functions other than the power on function and the timer function.

Then, the CPU 101 enters a standby state where it waits for the power to be switched on to receive a power on signal from the key operation section 110 (step B13).

On the other hand, in a case where it is determined at step B1 that the "emergency mode flag" is set, i.e., the power off operation is made in the emergency mode (step B1; Yes), the CPU 101 controls the alerting unit 111 to stop the alerting operation (step B2). Next, the CPU 101 sends a partial off signal (an unusual power off signal) to the power supply unit 113 (step B3). In response to this partial off signal, the power supply control unit 113C of the power supply unit 113 stops supplying power to the main display section 108, the sub display section 109, the alerting unit 111, etc.

Further, the power supply control unit 113C stops supplying power to the audio receiving process circuit 105C and audio sending process circuit 105D used only for audio communication and the data receiving process circuit 105E used only for e-mail reception, among the elements of the communication unit 105 (step B4). Furthermore, the power supply control unit 113C stops supplying power to the elements for lighting or blinking the lamp or generating sounds or vibrations when the main power is switched on. This makes the portable telephone apparatus 1 seem as if its power were completely switched off. However, the power supply unit 113 continues supplying power to the CPU 101, the element in the communication unit 105 that is necessary for sending e-mails, the GPS processing section 112, and the key operation section 110. Therefore, the function for switching on the main power of the portable telephone apparatus 1 when the power key PW is pressed, the timer function, the function for registering the current position to the telephone exchange 22, the function for determining the current position and generating current position information, the function for sending an e-mail including the current position information to a registered address, etc remain active.

Then, the CPU 101 obtains current position information indicating the current position by the GPS processing unit 112 (step B5). Then, the CPU 101 reads out the e-mail address of the destination pre-registered as the contact address in case of emergency from the storage unit 102, generates an emergency e-mail as shown in FIG. 7 which includes the "current position information", the "name" of the user, a "message", etc. and sends the e-mail by an e-mail sending function of the communication unit 105 (step B6). Further, the CPU 101 resets the emergency e-mail sending cycle timer (software timer) and again activates the timer.

Then, the CPU 101 determines whether or not a predetermined time (position registration cycle t2) has passed since the previous position registration, based on the count value of the position registration cycle timer (step B7). In this case, the position registration cycle t1 in the main power on state and the position registration cycle t2 in the main power off state are in a relationship t2>t1. These cycles are set in consideration of battery consumption, etc. However, if t2 is set extremely longer like t2>>t1, the notifying cycle (time interval) becomes too discrete. Therefore, t2 is set to, for example, about 1.5 to 3 times longer than t1.

In a case where it is determined at step B7 that the position registration cycle t2 or longer has passed since the previous position registration (step B7; Yes), the CPU 101 operates the data receiving process circuit 105E and data sending process circuit 105F of the communication unit 105 to emit a radio wave from the antenna 105A to perform the process of registering the position of the portable telephone apparatus 1 through a base station 21 in the neighborhood (step B8). Thus, the base station 21 that emits the strongest radio wave is registered to the telephone exchange 22 as the position of the portable telephone apparatus 1. That is, the portable telephone apparatus 1 notifies its position to the telephone exchange 22, and the telephone exchange 22 registers the notified position in the database.

In a case where the CPU 101 determines that the position registration cycle t2 has not passed since the previous position registration (step B7; No), the flow goes to step B9 jumping step B8.

Next, the CPU 101 controls the power supply control unit 113C to detect the remaining battery power (remaining energy) of the main battery MB, by controlling the power supply unit 113. The power supply control unit 113C notifies the detected remaining battery power to the CPU 101. The CPU 101 sets the time interval (emergency e-mail sending cycle) Tm2 between when the previous emergency e-mail was sent and when the next emergency e-mail is sent, in accordance with the remaining battery power (step B9). The remaining battery power and the emergency e-mail sending cycle Tm2 is, for example, in the relationship of inverse proportion, thus the scarcer the remaining battery power is, the longer the emergency e-mail sending cycle Tm2 is set. The emergency e-mail sending cycle Tm2 in the main power off state and the emergency e-mail sending cycle Tm1 in the main power on state are in a relationship Tm2>Tm1. The cycles Tm1 and Tm2 are set so with a view to saving battery consumption.

Next, the CPU 101 determines whether or not a time corresponding to the emergency e-mail sending cycle Tm2 or longer has passed since the previous emergency e-mail was sent, from the count value of the emergency e-mail sending cycle timer (step B10). In a case where the time corresponding to the emergency e-mail sending cycle Tm2 or longer has passed (step B10; Yes), the flow returns to step B5 so that the processes from the above-described step B5 may be performed and an emergency e-mail may be sent (steps B5 and B6). Thereafter, the CPU 101 performs position registration to the telephone exchange 22 each time the position registration cycle t2 passes (step B8), and sends an emergency e-mail each the emergency e-mail sending cycle Tm2 passes (step B6).

Meanwhile, in a case where it is determined at step B10 that the emergency e-mail sending cycle Tm2 has not passed (step B10; No), the flow goes to step B11, at which the CPU 101 determines whether or not a power on signal is output from the key operation section 110 (step B11). In a case where a power on signal is output (step B11; Yes), the CPU 101 starts the power on process of FIG. 6. Contrarily, in a case where no power on signal is output (step B11; No), the flow returns to step B7 so that the above-described process may be repeated.

As explained above, in the state that the emergency mode is set, the portable telephone apparatus 1 registers position information indicating its current position (the base station 21 from which the strongest radio wave is received) to the telephone exchange 22, and sends an emergency e-mail including the current position information to the registered destination, irrespective of whether the main power is on or off.

Next, the operation of the portable telephone apparatus 1 when the main battery MB possessed by the power supply unit 113 is detached will be explained.

When the main battery MB possessed by the power supply unit 113 is detached from the portable telephone apparatus 1, the battery detachment sensor 114 sends a detection signal indicating that the main battery MB is detached to the CPU 101.

Figure 9:
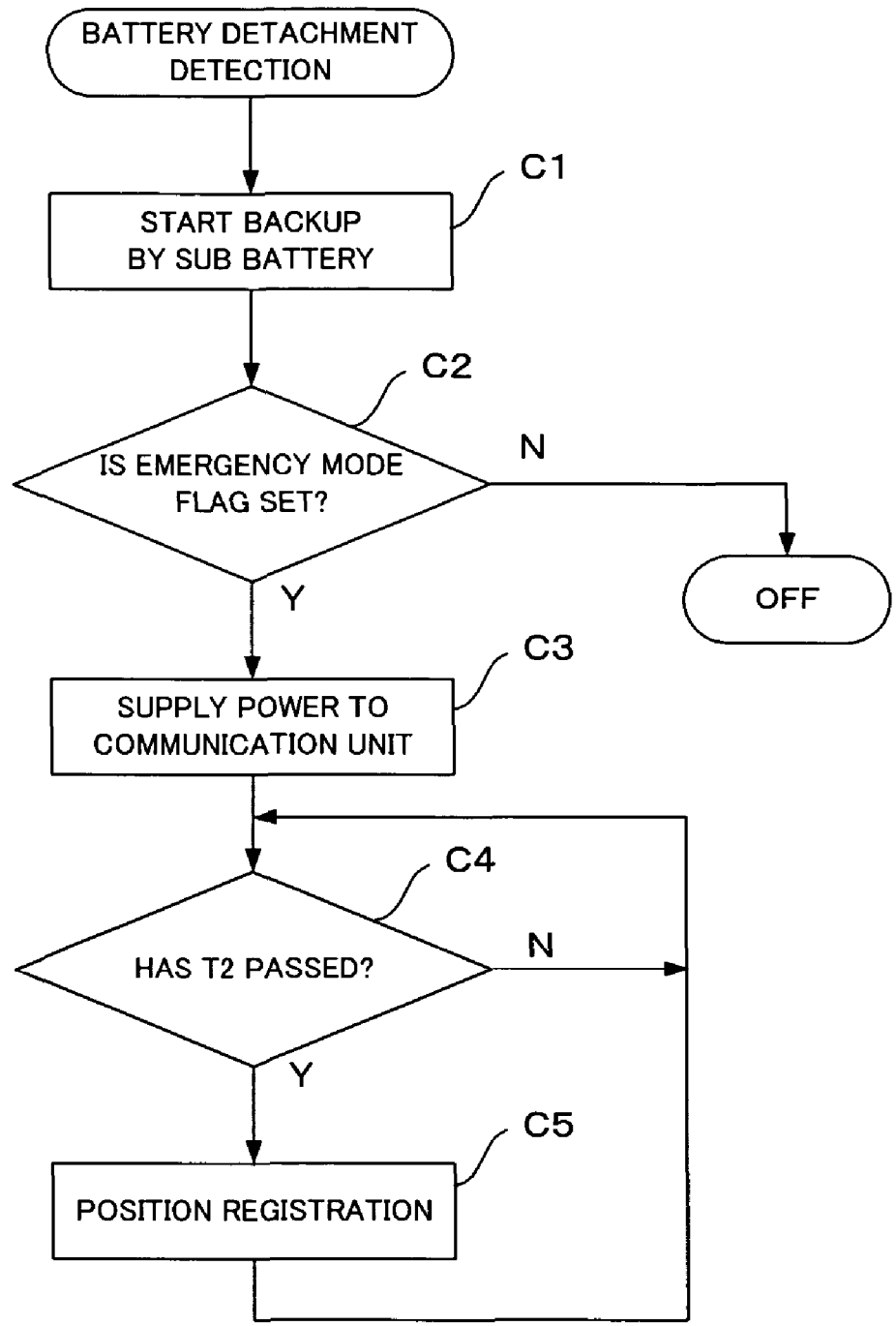
FIG. 9 is a flowchart showing an operation of the portable telephone apparatus to be performed when a main battery is detached from the portable telephone apparatus.

On receiving the detection signal from the battery detachment sensor 114, the CPU 101 starts the process shown in the flowchart of FIG. 9. First, the CPU 101 controls the power supply unit 113 to start power supply sourcing from the sub battery SB (step C1). Next, the CPU 101 checks whether or not the "emergency mode flag" is set in the storage unit 192 (step C2).

In a case where it is determined that the emergency mode flag is not set (step C2; No), i.e., in a case where the main battery MB is detached in a state that the emergency mode is not set, the CPU 101 terminates this process. To the contrary, in a case where it is determined that the emergency mode flag is set (step C2; Yes), the CPU 101 instructs the power supply control unit 113C of the power supply unit 113 to start supplying power to the data receiving process circuit 105E and data sending process circuit 105F of the communication unit 105 (step C3).

Then, the CPU 101 determines whether or not the predetermined position registration cycle t2 has passed since the previous position registration from the value of the position registration cycle timer (step C4), and waits until this position registration cycle t2 has passed (step C4; No). When it is determined that the position registration cycle t2 has passed (step C4; Yes), the CPU 101 operates the communication unit 105 to notify the base station 21 among the nearby base stations 21, that outputs the strongest carrier, that the portable telephone apparatus 1 is positioned in the administration area (cell) of that base station 21 (step C5). Thereby, the identification information of the portable telephone apparatus 1 is registered to the telephone exchange 22 in association with the identification information of that base station 21.

Thereafter, the flow returns to step C4 so that the above-described process may be repeated.

As explained above, according to the present embodiment, the CPU 101 determines whether or not the emergency mode is set, when the main power is switched off. Then, in a case where the emergency mode is not set, the CPU 101 stops supplying power to the elements constituting the portable telephone apparatus 1. Contrarily, in a case where the emergency mode is set, the CPU 101 stops supplying power to the main display section 108, the sub display section 109, the alerting unit 111, etc. except the communication unit 105, to keep the position registering function and position notifying function working. Accordingly, even when the main power is off, the portable telephone apparatus 1 can notify its position.

In other words, when the main power is switched off in the emergency mode, the portable telephone apparatus 1 continually maintains its position registering function and position notifying function, though it is seemingly not at all different from how it seems when it is in the ordinary power off state. Accordingly, for example, when a crime occurs, even if the main power of the portable telephone apparatus 1 is switched off by the criminal or by the user as forced by the criminal, the positions after the crime can be notified without the criminal noticing it.

Further, in the emergency mode, the portable telephone apparatus 1 periodically registers its position to the database of the telephone exchange 22 even while the main power is off. Accordingly, the position information service (position tracking service) using the positions of the base stations 21 is available.

The position registration cycle t2 in the main power off state is longer than the position registration cycle t1 in the main power on state. Accordingly, after the main power is switched off, it is possible to register the positions while saving the power consumption.

Likewise, the emergency e-mail sending cycle Tm2 in the main power off state is longer than the emergency e-mail sending cycle Tm1 in the main power on state. Accordingly, after the main power is switched off, it is possible to notify the current position to a predetermined destination while saving the power consumption. The emergency e-mail sending cycle Tm2 is not a fixed value, but a value that changes in accordance with the remaining battery power. For example, as the remaining battery power becomes less, the emergency e-mail sending cycle Tm2 can be lengthen. For example, the CPU 101 may determine the remaining power in the battery MB and in the sub battery SB through the power supply control unit 113C and periodically change the emergency e-mail sending cycles Tm1 and Tm2 based on the battery remaining power.

Further, after the main power is switched off in the emergency mode, the CPU 101 controls power supply to the communication unit 105, such that among various communication functions, the position notifying function is effective, and the calling function and e-mail receiving function are ineffective. Therefore, the power can be saved.

Further, in a case where the main battery MB is detached in the emergency mode, the CPU 101 switches the power source for the position registering function to the sub battery SB. Therefore, for example, not only when the power is switched off by a criminal, but also when the main battery MB is detached by a criminal, the positions can be notified.

The present invention is not limited to the above-described embodiment, but can be modified and applied in various manners.

The portable telephone apparatus 1 according to the above-described embodiment uses latitude and longitude obtained by the GPS processing unit 112 as the position information to be inserted into the emergency e-mail. Information regarding a landmark in the neighborhood of the area specified by the latitude and longitude may be inserted in addition to the latitude and longitude. In this case, information regarding a landmark is stored in the storage unit 102 or the like for each combination of latitude and longitude. Then, the CPU 101 obtains information regarding a landmark from the information of latitude and longitude obtained by the GPS processing unit 112, inserts the landmark information together with the information of latitude and longitude into an emergency e-mail, and sends the e-mail.

The portable telephone apparatus 1 according to the above-described embodiment includes telephone apparatuses such as a PHS (Personal Handy Phone System), etc. Further, the present invention is not limited to a portable telephone apparatus, but also applicable to portable electronic apparatuses such as a PDA (Personal Digital Assistant), an electronic camera, an electronic wristwatch, an audio player, etc. which have a communication function. That is, the present invention can be applied to any kind of electronic apparatus as long as it has a communication function, a position detecting function, an alerting function, or the like, irrespective of whatever its main function is.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2005-336599 filed on Nov. 22, 2005 and including specification, claims, drawings and summary. The disclosure of the above Japanese Patent Application is incorporated herein by reference in its entirety.

What is claimed is:

1. An electronic apparatus, comprising:
a position determining unit which determines a position of the electronic apparatus;
a notifying unit which notifies position information which specifies the position determined by the position determining unit to a predetermined destination;
an operation mode specifying unit which allows a user to specify a predetermined operation mode; and
an operation mode-satisfied determining unit which determines whether the predetermined operation mode is set and whether the predetermined operation mode is satisfied, when an instruction for switching off a main power of the electronic apparatus is given,
wherein where the operation mode-satisfied determining unit determines that the predetermined operation mode is satisfied, even after the main power is switched off, the position determining unit determines the position of the electronic apparatus and the notifying unit notifies the position information to the predetermined destination.

2. The electronic apparatus according to claim 1, further comprising
a power supply unit which supplies an operation power to the position determining unit, the notifying unit, and the operation mode-satisfied determining unit,
wherein the power supply unit i) stops supplying the operation power to the position determining unit and the notifying unit when the operation mode-satisfied determining unit determines that the predetermined operation mode is not satisfied, and ii) continues supplying the operation power to the position determining unit and the notifying unit when the operation mode-satisfied determining unit determines that the predetermined operation mode is satisfied.

3. The electronic apparatus according to claim 2, further comprising:
a display section which displays data,
wherein when the main power is switched off, the power supply unit stops supplying power to the display section irrespective of whether the predetermined operation mode is satisfied or not satisfied, so that the position determining unit and the notifying unit are seemingly unrecognizable as to whether they are operating or not.

4. The electronic apparatus according to claim 1, further comprising:
an alerting unit which generates an alert,
wherein the predetermined operation mode is an emergency mode in which the alerting unit generates an alert, and where the instruction for switching off the main power is given in the emergency mode, even after the alerting unit stops alerting, the position determining unit determines the position of the electronic apparatus and the notifying unit notifies the position information to the predetermined destination.

5. The electronic apparatus according to claim 4, wherein the predetermined operation mode is an operation mode in which the position determining unit determines a current position and the notifying unit notifies the position information, and where an instruction for switching off the main power is given in the predetermined operation mode, even after the main power is switched off, the position determining unit determines the position of the electronic apparatus and the notifying unit notifies the position information to the predetermined destination.

6. The electronic apparatus according to claim 5, wherein the notifying unit notifies the position information repetitively to the predetermined destination.

7. The electronic apparatus according to claim 6, wherein the notifying unit notifies the position information repetitively to the predetermined destination even while the main power is on, and a notifying cycle while the main power is on is set shorter than a notifying cycle while the main power is off.

8. The electronic apparatus according to claim 6, further comprising:
a power supply unit, having a battery, for supplying an operation power to the position determining unit, the notifying unit, and the operation mode-satisfied determining unit,
wherein the power supply unit comprises a unit which sets the notifying cycle in accordance with an amount of remaining energy stored in the battery.

9. The electronic apparatus according to claim 1, wherein the notifying unit comprises a unit which generates an e-mail including the position information, and a unit which sends the generated e-mail to a predetermined address.

10. The electronic apparatus according to claim 1, wherein the position determining unit determines an administration area of a base station, among a plurality of base stations constituting a mobile communication network, in which the electronic apparatus is positioned and
wherein, by notifying identification information of the electronic apparatus to the base station determined by the position determining unit, the notifying unit performs a process of registering information which associates the electronic apparatus with the base station administering the area in which the electronic apparatus is positioned, to a telephone exchange of the mobile communication network.

11. The electronic apparatus according to claim 1, further comprising:
a power supply unit, having first and second batteries, for supplying operation power to the position determining unit, the notifying unit, and the operation mode-satisfied determining unit,
wherein the power supply unit supplies the operation power to the position determining unit, the notifying unit, and the operation mode-satisfied determining unit, by using energy stored in the first battery; and the power supply unit supplies the operation power to the position determining unit and the notifying unit by using energy stored in the second battery when the first battery is removed.

12. A communication system comprising:
a network having a plurality of base stations and a telephone exchange; and a communication apparatus which communicates with another communication apparatus through the base stations and the telephone exchange,
wherein the communication apparatus comprises:
- a position determining unit which determines a position of the communication apparatus;
- a notifying unit which notifies position information which specifies the position determined by the position determining unit to a predetermined destination;
- an operation mode specifying unit which allows a user to specify a predetermined operation mode; and
an operation mode-satisfied determining unit which determines whether the predetermined operation mode is set and whether the predetermined operation mode is satisfied, when an instruction for switching off a main power of the communication apparatus is given,
  - wherein where the operation mode-satisfied determining unit determines that the predetermined operation mode is satisfied, even after the main power is switched off, the position determining unit determines the position of the communication apparatus and the notifying unit notifies the position information to the predetermined destination.

13. A computer readable medium storing a computer program for controlling a computer having a communication function to function as:
   - a position determining unit which determines a position of the computer;
   - a notifying unit which notifies position information which specifies the position determined by the position determining unit to a predetermined destination;
   - an operation mode specifying unit which allows a user to specify a predetermined operation mode; and
   - an operation mode-satisfied determining unit which determines whether a predetermined operation mode is set and whether the predetermined operation mode is satisfied, when an instruction for switching off a main power of the computer is given,
   wherein where the operation mode-satisfied determining unit determines that the predetermined operation mode is satisfied, even after the main power is switched off, the position determining unit determines the position of the computer and the notifying unit notifies the position information to the predetermined destination.

* * * * *